United States Patent [19]

Hacker

[11] Patent Number: 4,950,524

[45] Date of Patent: Aug. 21, 1990

[54] BACON PAD

[76] Inventor: Robert L. Hacker, 888 E. Shady La. #234, Neenah, Wis. 54956

[21] Appl. No.: 311,729

[22] Filed: Feb. 17, 1989

Related U.S. Application Data

[63] Continuation-in-part of Ser. No. 156,217, Feb. 16, 1988, abandoned.

[51] Int. Cl.$^5$ .............................................. B32B 3/02
[52] U.S. Cl. ................................. 428/163; 428/167; 428/168; 428/169; 428/182; 428/183; 428/184; 428/185; 428/186; 426/107; 426/113; 426/243; 219/10.55 E; 99/400; 99/425; 99/446
[58] Field of Search ............ 99/400, 425, 446, DIG. 4; 219/10.55 E; 426/107, 113, 243; 428/163, 167, 168, 169, 182, 183, 184, 185, 186

[56] References Cited

U.S. PATENT DOCUMENTS

| | | | |
|---|---|---|---|
| 3,033,708 | 5/1962 | McKee | 428/182 |
| 4,121,510 | 10/1978 | Frederick | 219/10.55 E |
| 4,140,889 | 2/1979 | Mason, Jr. et al. | 219/10.55 E |
| 4,190,757 | 2/1980 | Turpin et al. | 219/10.55 E |

*Primary Examiner*—Patrick Ryan
*Attorney, Agent, or Firm*—Donald Cayen

[57] ABSTRACT

A bacon pad made of liquid absorbent wood fibers is suitable for cooking bacon in a microwave oven. The pad is made as a three-ply laminate, with a corrugated center ply sandwiched between two flat outer plies. The pad is designed to absorb fat from the bacon while maintaining adequate mechanical strength. In one version, the pad is formed with angled barriers to positively prevent liquid fat from flowing off the pad.

6 Claims, 2 Drawing Sheets a# BACON PAD

BACKGROUND OF THE INVENTION

This application is a continuation-in-part of Ser. No. 07/156,217, filed 2-16-88, now abandoned.

1. Field of the Invention

This invention pertains to food preparation, and more particularly to apparatus for cooking meat products.

2. Description of the Prior Art

The advent of microwave ovens has radically altered the manner in which people cook their food. Among other things, microwave cooking has required changes in the utensils that hold the food during the cooking process. For example, the common frying pan that has been closely associated with frying bacon and sausage for countless years is not suitable for frying those foods in microwave ovens. On the other hand, the problem of accumulated and spattering fat remains when bacon is cooked in a microwave oven.

Various utensils have been developed to hold food during microwave cooking. For instance, U.S. Pat. No. 4,121,510 discloses a ribbed and corrugated rack and pan. Juices and fluids secreted from the food, particularly meats, are collected and absorbed within the rack. A liquid impervious chemical coating is applied to the outside of the device to block transfer of liquids therethrough. The costs of the required mold and the chemical coating render the product of the U.S. Pat. No. 4,121,510 undesirably expensive.

U.S. Pat. No. 4,214,515 describes a disposable structure designed especially for cooking bacon. The structure is composed of a support portion that holds the bacon strips and that fits within a base. The two-component structure is not entirely satisfactory because it requires assembly prior to use and also contributes to a high cost.

U.S. Pat. No. 4,394,410 discloses a foil broiling sheet comprised of several laminations. A center lamination may be ribbed and is made of a liquid absorbing material. The outer laminations are made of metal foil, which renders them unsuitable for microwave oven use. In addition, exuded liquids must pass through holes in the top metallic foil in order to enter the absorbent middle lamination. Should a foil hole become plugged, the liquid in the surrounding area may puddle on the metal foil and thus be likely to spatter or roll off the sheet while cooking and spilled when removed from the oven.

Non-metallic materials such as plastic or glass plates may be used to cook bacon and similar greasy foods in microwave ovens. However, such plates require the cook to dispose of the accumulated fat and to wash the plate, and frequently the microwave oven, after cooking.

Thus, a need exists for an improved utensil for cooking bacon in microwave ovens.

SUMMARY OF THE INVENTION

In accordance with the present invention, an economical and convenient pad is provided that holds bacon and similar foods for cooking in a microwave oven. This is accomplished by apparatus that includes a disposable corrugated tray that is designed to combine mechanical strength with liquid absorbing qualities.

The bacon pad is formed as a generally flat three-ply laminate, with the three components being made of non-metallic materials. The first ply is a corrugated sheet made of a liquid absorbent material such as Kraft paper. To the peaks on one face of the corrugated sheet is bonded the second ply, which preferably is a flat sheet of Kraft paper. The third ply is bonded to the peaks on the second face of the corrugated sheet. The third ply may be a bleached paper composition.

The laminate is preferably manufactured in very large sheets that are then die cut to the size of the individual pads. The pads may be of any size that fit into a conventional microwave oven. For convenient gripping, the trays may be die cut with one or more handles.

In use, the bacon pad of the present invention is placed with the bleached third ply facing upwardly. The bacon or other food product to be cooked is placed on the bleached third ply. To prevent spattering, one or more layers of paper towels are placed over the bacon strips before cooking. The combination of the bleached top ply and corrugated center ply absorbs substantially all cooking fluids, such that the bottom ply remains dry. Consequently, the floor of the microwave oven remains clean and dry and requires no wiping after cooking the bacon. The mechanical strength provided by the three ply laminate remains even after the bacon pad top and center plies become soaked with liquid. The extremely low cost of the bacon pad and paper towels permit both to be disposed of after one use.

Further in accordance with the present invention, the margins of the bacon pad are angled slightly with respect to the plane of the central area of the pad. For that purpose, a shallow crease line is formed in the top ply parallel to and a short distance from the tray peripheral edges. The margins bounded by the crease lines and the tray edges are bent slightly upwardly along the crease lines, thereby creating a barrier to liquids that might tend to flow off the edges of the bacon pad. Consequently, excess grease and other liquids that may be exuded faster than the tray can absorb them are positively retained within the tray central area for ultimate absorption.

Other advantages, benefits, and features of the invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
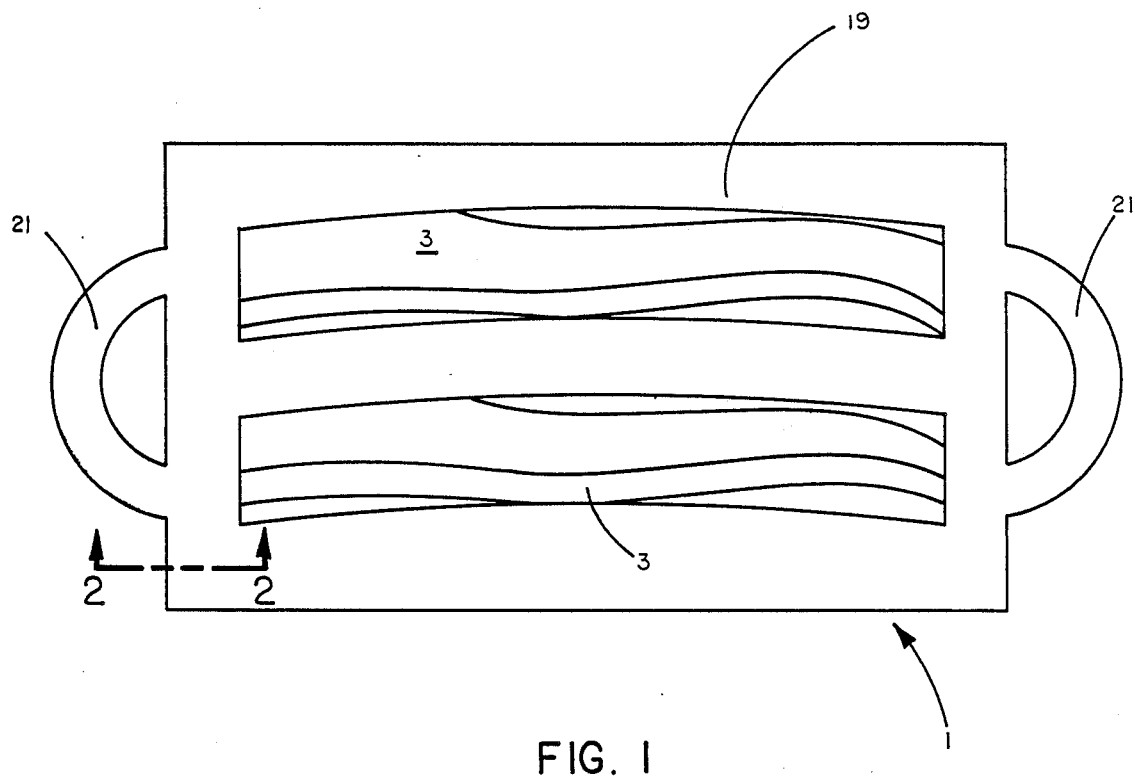
FIG. 1 is a top view of the bacon pad of the present invention.

Referring to FIG. 1, a bacon pad 1 is illustrated that includes the present invention. The bacon pad is particularly useful for holding strips of bacon 3, or sausages or similar food items not shown, for cooking in a microwave oven. However, it will be understood that the invention is not limited to microwave cooking applications.

Figure 2:
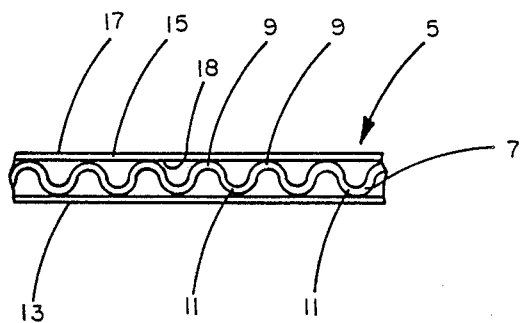
FIG. 2 is an enlarged cross sectional view taken along lines 2—2 of FIG. 1.

Looking also at FIG. 2, the bacon pad 1 is formed as a generally flat and thin laminate 5 composed of three plies of material. The laminate 5 has a center ply 7 that is sandwiched between a first outer ply 13 and a second outer ply 15. The center ply 7 is corrugated so as to form upper peaks 9 and lower peaks 11.

The preferred material for the corrugated center ply is a relatively porous, inexpensive, and liquid absorbent wood fiber product. Through extensive testing, I have found that No. 33 recycled Kraft paper is entirely satisfactory for the corrugated center ply 7. Preferably, the corrugated center ply has a weight and configuration known in the paperboard industry as 275 C flute. To the lower peaks 11 of the corrugated center ply 7 is bonded the flat first outer ply 13. The first outer ply 13 is preferably made of a liquid absorbent relatively strong but flexible material. No. 42 Kraft paper is an excellent material for the first outer ply.

The second flat outer ply 15, which may be a flexible wood fiber product, is bonded to the upper peaks 9 of the corrugated middle ply 7. The preferred material for the second outer ply 15 is a No. 33 heavy medium paper with clay white bleached into at least the outside surface 17. Both the outer surface 17 and the inner surface 18 of the outer ply 15 may be bleached clay white, if desired. I have found that although it is possible to use an unbleached No. 33 heavy medium Kraft paper as the second outer ply 15, that material has liquid absorbing qualities that are inferior to those of No. 33 heavy medium clay white paper.

The bacon pad 1 is exposed to a hot and greasy environment during use. To provide satisfactory service under such conditions, the center and first outer plies 7 and 13, respectively, are bonded together with an adhesive made from starch granules suspended in water. Additives such as caustic soda and borax provide desirable gelatinization temperatures and effective ply wetting, together with high tack to hold the plies together at high machine speeds. Similarly, the second flat outer ply 15 is bonded to the upper peaks 9 of the corrugated center ply 7 with the starch-caustic soda-borax adhesive. The resulting laminate 5 is preferably about 0.13 inches thick. That thickness provides a structure that has a very low weight and cost, but that nevertheless possesses remarkable mechanical strength and liquid absorbing qualities.

As shown in FIG. 1, the bacon pad 1 may be formed as a generally rectangular tray 19. Other shapes are suitable, of course, but I prefer the rectangular shape illustrated. To facilitate using the bacon pad, a handle 21 may be integrally formed on one or both ends of the tray 19. Although arcuate handles 21 are shown in FIG. 1, it will be appreciated that handles of other shapes may also be employed.

To use the bacon pad 1 of the present invention, it is placed with the outer ply 15 facing upwardly, such that the bleached surface 17 is the top surface. Strips of bacon 3 are placed on the bleached top surface 17. The bacon is preferably covered with one or more layers of conventional paper towels, not illustrated. The assembly of bacon pad, bacon, and towels is placed in the microwave oven for appropriately cooking the bacon. The bleached clay white upper ply 15 and porous corrugated center ply 7 cooperate to absorb virtually all the liquid fat that is produced as the bacon cooks. Consequently, the second or bottom ply 13 generally remains dry. Thus, no fat or oil seeps through to the microwave oven floor, thereby facilitating cleaning. When the bacon has been adequately cooked, the bacon pad is removed from the microwave oven, the bacon is served, and the pad and towels are discarded. The three-ply design of the bacon pad renders it sufficiently strong for normal handling even with copious quantities of fat absorbed therein. I have found that by placing three layers of paper towels over the bacon and tray, even bacon having a high fat content can be cooked into delicious and appetizing fare while keeping the microwave oven dry and free of exuded and spattered fat.

Figure 3:
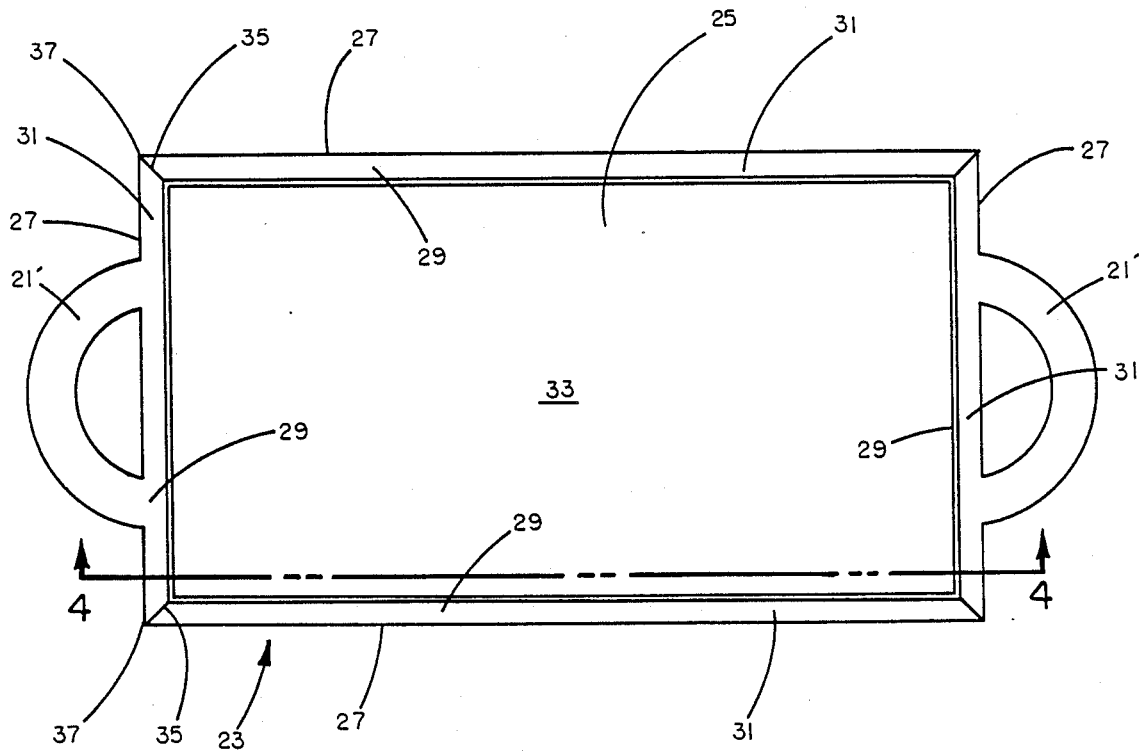
FIG. 3 is a top view of a modified embodiment of the bacon pad of the present invention.
Figure 4:
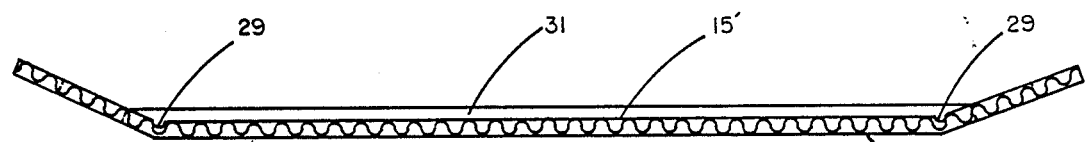
FIG. 4 is a cross sectional view taken along lines 4—4 of FIG. 3.

Further in accordance with the present invention, the bacon pad may be modified slightly to provide even greater assurance that all the fat or other liquid is absorbed within the laminate. Turning to FIGS. 3 and 4, a modified bacon pad 23 is shown that is made of a three-ply laminate 5' substantially identical to the laminate 5 described previously with respect to bacon pad 1. The pad 23 is illustrated as having a generally rectangular shaped tray 25. Near the peripheral edges 27 of the tray 25 are formed respective crease lines 29 in the bleached outer ply 15' so as to form margins 31 around a central area 33. Additional crease lines 35 extend from the tray corners 37 to the crease lines 29. The tray margins 31 are bent upwardly slightly along all the crease lines, thereby converting the margins into shallow barriers. As a result, liquid grease and other fluids from the bacon (not shown in FIGS. 3 and 4) are positively prevented from flowing off the peripheral edges 27 and onto a microwave oven floor. Handles 21, substantially similar to the handles 21 described with respect to FIGS. 1 and 2 may be utilized in conjunction with the pad 23.

Figure 5:
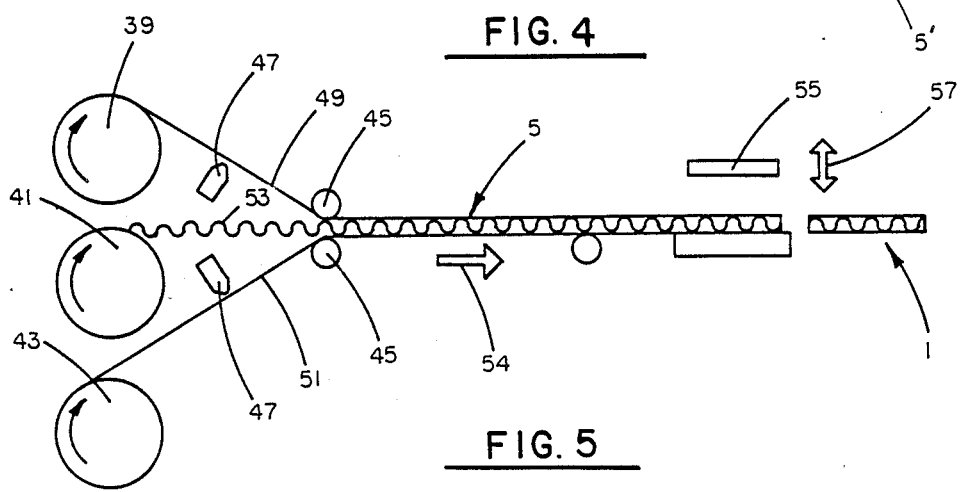
FIG. 5 is a simplified schematic side view of apparatus for manufacturing the present invention.

Turning to FIG. 5, a simplified schematic diagram of apparatus for making the bacon pad of the present invention is illustrated. Reference numeral 39 represents a supply roll, which preferably is a No. 33 heavy medium clay white paper that may be manufactured and rolled by known means. Reference numeral 41 is a roll of corrugated No. 33 Kraft paper, and reference numeral 43 is a roll of No. 42 Kraft paper. Respective webs 49, 53, and 51 from the rolls 39, 41, and 43 are pulled continuously therefrom by means of draw rolls 45. The draw rolls 45 may also serve as nips. Adhesive from applicators 47 is deposited on the webs 49 and 51. The webs 49 and 51 are bonded to opposite faces of the web 53 at the rolls 45, thereby creating the laminate 5, with the webs 49, 51, and 53 forming the plies 15, 13, and 7, respectively. The laminate is propelled continuously in a downstream direction 54.

To cut bacon pads 1 from the laminate 5 on a continuous basis, a die board 55 reciprocates in the direction of arrow 57 perpendicular to the plane of the moving laminate. The bacon pads are collected and packaged by conventional machinery for shipment. The die board 55 can be made to produce bacon pads of any desired size and shape. Further, the die board can be made so as to simultaneously form the crease lines 29 and to slightly fold up the margins 31.

Thus, it is apparent that there has been provided, in accordance with the invention, a bacon pad that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A bacon pad for cooking bacon or the like comprising:
   a. a first outer ply of flat non-metallic liquid absorbent material having outside and inside surfaces and a size and shape suitable for holding a selected number of bacon strips thereon and for insertion into a microwave oven;
   b. a center ply of non-metallic corrugated liquid absorbent material having opposed upper and lower peaks and being coterminous with the first ply, the lower peaks of the center ply being adhesively bonded to the inside surface of the first ply with an adhesive made from starch granules suspended in water; and
   c. a second outer ply of non-metallic flat material, the second outer ply being adhesively bonded to the upper peaks of the corrugated center ply with an adhesive made from starch granules suspended in water and being coterminous therewith to create a three ply laminate,
   so that liquids secreted from the bacon during cooking is absorbed into the first outer ply and the center ply.

2. A pad for cooking bacon or the like in a microwave oven comprising:
   a. a generally rectangular tray formed with a plurality of crease lines parallel to and at a predetermined distance from the tray peripheral edges to thereby create a generally flat central area and a plurality of margins bounding the central area, the central area being dimensioned to support a selected number of bacon strips, the margins being folded upwardly slightly from the plane of the central area; and
   b. at least one handle integrally joined to a selected margin, where in the tray and handle are made from a non-metallic laminate comprising a center corrugated ply having upper and lower peaks and first and second outer plies adhesively bonded to be center ply lower and upper peaks, respectively, by an adhesive made from starch granules suspended in water, the center and outer plies being made from liquid absorbent materials,
   so that fat exuded from the cooking bacon is positively retained within the tray central area by the angled margins and is absorbed therein.

3. The pad of claim 2 wherein:
   a. the laminate center ply is made from No. 33 Kraft paper;
   b. the laminate first outer ply is made from No. 42 Kraft paper; and
   c. the laminate second outer ply is made from No. 33 heavy medium paper.

4. The pad of claim 3 wherein:
   a. at least the outside surface of the second outer ply is bleached clay white; and
   b. the crease lines between the tray central area and the margins are formed in the first outer ply.

5. A method of making pads for cooking bacon or the like comprising the steps of:
   a. providing a web of flexible corrugated non-metallic liquid absorbent material having upper and lower peaks;
   b. adhesively bonding first and second outer webs of non-metallic flat flexible liquid absorbent material to the respective peaks of the corrugated web with an adhesive made from starch granules suspended in water to thereby create a three-ply laminate;
   c. providing a die board corresponding to a generally rectangular pad dimensioned to hold a selected number of bacon strips and to fit inside a microwave oven; and
   d. simultaneously cutting the laminate with the die board at selected locations therealong to produce the pads and creating the laminate first outer web at selected locations thereon to form a planar central area with margins around the periphery of the pad.

6. The method of claim 5 comprising the further step of bending the margins to an acute angle relative to the central area along the crease lines, thereby bounding the pad central area with angled margins.

* * * * *